US012570538B2

(12) United States Patent
Rabaioli et al.

(10) Patent No.: US 12,570,538 B2
(45) Date of Patent: Mar. 10, 2026

(54) ALUMINA MODIFIED WITH A SHORT CHAIN CARBOXYLIC ACID FOR USE AS A COATING AND A METHOD FOR PRODUCING THE SAME

(71) Applicant: Sasol (USA) Corporation, Houston, TX (US)

(72) Inventors: Maria Roberta Rabaioli, Westlake, LA (US); Umesh Chaudhary, Westlake, LA (US); Luke Andrew Tatum, Houston, TX (US); Bharat Kumar, Houston, TX (US)

( * ) Notice: Subject to any disclaimer, the term of this patent is extended or adjusted under 35 U.S.C. 154(b) by 705 days.

(21) Appl. No.: 17/909,617

(22) PCT Filed: Mar. 10, 2021

(86) PCT No.: PCT/US2021/021632
§ 371 (c)(1),
(2) Date: Sep. 6, 2022

(87) PCT Pub. No.: WO2021/183602
PCT Pub. Date: Sep. 16, 2021

(65) Prior Publication Data
US 2023/0348288 A1     Nov. 2, 2023

Related U.S. Application Data

(60) Provisional application No. 62/987,616, filed on Mar. 10, 2020.

(51) Int. Cl.
*C01F 7/14*          (2022.01)
*C09D 1/00*          (2006.01)
(Continued)

(52) U.S. Cl.
CPC .................. *C01F 7/14* (2013.01); *C09D 1/00* (2013.01); *C09D 5/08* (2013.01); *C09D 7/20* (2018.01);
(Continued)

(58) Field of Classification Search
CPC .... C01F 7/14; C01P 2002/60; C01P 2002/74; C01P 2004/54; C01P 2004/64;
(Continued)

(56) References Cited

U.S. PATENT DOCUMENTS 4,013,590 A      3/1977  Buonomo et al.
4,419,137 A      12/1983  Cayless et al.
(Continued)

FOREIGN PATENT DOCUMENTS

CN          104815661 A  *   8/2015
CN          108368355       8/2018
(Continued)

OTHER PUBLICATIONS

Li et al. CN104815661A English (Year: 2015).*
(Continued)

*Primary Examiner* — Sally A Merkling
*Assistant Examiner* — Jordan W Taylor
(74) *Attorney, Agent, or Firm* — Werner IP Law, P.C.

(57)          ABSTRACT

The invention provides for a method of producing a modified alumina for use in a coating composition, the method being characterised by hydrothermally treating an alumina suspension under specific conditions before and/or after adding an organic modifier. The invention further provides for a modified alumina made according to the method of the invention and to uses of the modified alumina in coating applications including anti-corrosive compositions and adhesive coatings.

9 Claims, 3 Drawing Sheets a) Comparative Example 1 b) Example 1 (coated)

(51) Int. Cl.
  *C09D 5/08* (2006.01)
  *C09D 7/20* (2018.01)
(52) U.S. Cl.
  CPC ...... *C01P 2002/60* (2013.01); *C01P 2002/74* (2013.01); *C01P 2006/12* (2013.01); *C01P 2006/80* (2013.01)
(58) Field of Classification Search
  CPC .. C01P 2006/12; C01P 2006/80; C09C 1/407; C09C 3/08; C09D 1/00; C09D 5/08; C09D 5/084; C09D 7/20; C09D 7/62; C09D 7/67; C09D 7/70
  See application file for complete search history.

(56) References Cited

U.S. PATENT DOCUMENTS

| | | | | |
|---|---|---|---|---|
| 7,244,498 | B2 * | 7/2007 | Cook | B01J 2/30 428/407 |
| 10,011,705 | B2 * | 7/2018 | Loscutova | C07F 5/069 |
| 11,078,367 | B2 * | 8/2021 | Rabaioli | C09C 3/08 |
| 2007/0098990 | A1 * | 5/2007 | Cook | C08K 3/346 428/404 |
| 2020/0056049 | A1 | 2/2020 | Rabaioli et al. | |

FOREIGN PATENT DOCUMENTS

| | | | |
|---|---|---|---|
| CN | 110215911 | 9/2019 | |
| RU | 2221628 | 1/2004 | |
| WO | 8607371 | 12/1986 | |
| WO | 2011081874 | 7/2011 | |
| WO | 2012050984 | 4/2012 | |
| WO | 2017075333 | 5/2017 | |
| WO | 2018044533 | 3/2018 | |
| WO | 2018231761 | 12/2018 | |
| WO | WO-2018231761 A1 * | 12/2018 | ............ C09C 1/407 |

OTHER PUBLICATIONS

Zhang et al. Cryst. Growth Des. 2018, 18, 3596-360 (Year: 2018).*
Zhang et al. Cryst. Growth Des. 2018, 18, 3596-360 Supporting Info (Year: 2018).*
Bertazzo et al. Langmuir, 2010, 26, 5, 3364-3371 (Year: 2010).*
Landry et al. J. Mater. Chem. 1995, 5, 2, 331-341 (Year: 1995).*
Mishra, et al., Effect of Nanocrystalline Grain Size on the Electrochemical and Corrosion Behavior of Nickel, Corrosion Science, 2004, p. 3019-3029, vol. 46, issue 12.

* cited by examiner a) Comparative Example 1          b) Example 1 (coated)

ALUMINA MODIFIED WITH A SHORT CHAIN CARBOXYLIC ACID FOR USE AS A COATING AND A METHOD FOR PRODUCING THE SAME

CROSS-REFERENCE TO RELATED APPLICATION

This application claims priority to U.S. Application No. 62/987,616 filed on Mar. 10, 2020, the disclosure of which is incorporated herein by reference for all purposes.

FIELD OF THE INVENTION

This invention relates generally to coating compositions. More particularly, this invention relates to a method of preparing a modified alumina composition, to a modified alumina composition and to the use of a modified alumina composition as a coating, particularly in anticorrosion and adhesion applications.

BACKGROUND OF THE INVENTION

Corrosion protection of surfaces is well known and widely practiced. Corrosion protection of metal surfaces is generally achieved by applying inhibitors, by adding passive alloy elements and by applying protective coatings to the metal, amongst other methods. For corrosion protection of metal surfaces, the microstructure of the anticorrosion material is an important property.

In metal surface corrosion protection, modification of the microstructure of the metal is a technique applied in practice. For example, the behavior of nanocrystalline nickel (8-28 nm) produced by electrodeposition, compared to coarse grain nickel has been studied and reported on ("*Effect of nanocrystalline grain size on the electrochemical and corrosion behavior of nickel*", Corrosion Science 46(12): 3019-3029, incorporated herein by reference for all purposes). Nanocrystalline nickel was found to be susceptible to corrosion due to the defective nature of the film produced by electrodeposition.

The technique of sol-gel coating is often applied to articles having complex geometry. Most research done in this area uses an organic corrosion inhibitor, starting from a solution of metal or alkoxide precursors. Sol-gel proceeds via the hydrolysis and condensation of a precursor. During condensation a gel is formed. Aging promotes condensation reactions which eventually leads to the formation of a film coating with increased thickness. However, often the film coating has many defects. Any weakness in the film coating can be a starting point for corrosion. Typically, an organic compound is embedded into the gel. If the gel weakly interacts with the organic compound, the bonds between the gel and organic compound may not be stable against weathering corrosion. Furthermore, although the presence of a high amount of organic compound leads to the formation of a film coating of increased thickness (which functions better as a corrosion protection barrier), a high organic compound concentration can lower the adhesion of the gel to the substrate and can thus adversely impact the corrosion protection performance of the film coating. Corrosion protection performance of the film coating can also be impacted by the reversible nature of the hydrolysis reaction of the precursor. For example, water penetration may damage the integrity of the organic layer and reduce corrosion protection performance.

Different methods have been proposed to include corrosion inhibitors such as phosphonic acids and 2-mercaptobenzimidazole (MBI) in sol-gel film coatings. However, a problem associated with these corrosion inhibitors is that it is difficult to achieve an optimum balance between concentration and solubility. On the one hand, a high solubility can limit the prolonged corrosion protection performance because the substrate may be leached out, while on the other hand, a low solubility can lead to low corrosion protection performance due to the low concentration of corrosion inhibitor present. This challenge has been addressed, for example, by using organic inhibitors that are released by a change in pH, thereby to inhibit corrosion. However, if there is no pH change, then there is no release of the pH-triggered organic corrosion inhibitors and corrosion protection performance even with organic inhibitors may therefore not be effective.

Dip and spin coating techniques are commonly used to apply corrosion inhibitors. Spin coating can provide thin films, e.g. by centrifugal force, but has the obvious drawback that the shape of the substrate strongly impacts the ability to coat the substrate effectively. Dip coating is often the most convenient method for irregularly shaped objects or objects with complex geometry. Generally, it is well understood in the art that the coating technique used should be able to cover the entire surface to be protected with the corrosion inhibitor. Spraying and electro-deposition are also widely practiced, however, the efficacy of spray dispersion is not well documented.

U.S. Pat. No. 4,419,137, incorporated herein by reference for all purposes, is directed to a corrosion inhibitor which comprises particles of an inorganic oxide selected from the group consisting of silica and alumina, having corrosion inhibiting metal cations chemically bonded to the surface of the particles. U.S. Pat. No. 4,419,137 reports on the ion exchange of alumina with calcium hydroxide, and describes a paint formulation using exchanged silica.

WO86/07371, incorporated herein by reference for all purposes, discloses a corrosion protection composition comprising alumina trihydrate $Al(OH)_3$, an amount of 10-100 parts by weight of another oxide, and an amount of 0-40 parts by weight of calcium and/or magnesium carbonate, having a grain size less than 20 μm.

WO2012/050984, incorporated herein by reference for all purposes, teaches a corrosion inhibitor which selectively adsorbs on the metal surface and creates a barrier that prevents access of the corrosive agent to the surface. It is taught that a nanostructure carrier, e.g. alumina, can be used to supply the corrosion inhibitor, but the use of alumina is not exemplified.

WO2011/081874, incorporated herein by reference for all purposes, is directed to composite inorganic particles and methods of making and using same. WO2011/081874 mentions the use of metal oxides as anti-corrosion agents, but exemplifies only the use of silica.

There are clearly drawbacks associated with corrosion inhibitors and coating techniques. The performance of a corrosion inhibitor depends heavily on the corrosion inhibitor itself (e.g. the preparation method), and the efficacy of the coating technique used to apply the inhibitor to the substrate.

Against the backdrop of the problems associated with corrosion inhibitors and coating techniques in the art, the inventors have found a nanocrystalline coating in the form of an organically modified boehmite composition that displays favorable anticorrosion properties.

SUMMARY OF THE INVENTION

When discussing ranges throughout this application, the use of the word "between" is intended to be inclusive of the ends of the ranges, e.g., between 3 and 5 nm includes 3 nm and 5 nm.

According to a first aspect of the invention, there is provided a method of producing a modified alumina, the method comprising the steps of:

i) providing an alumina suspension comprising alumina and water, the alumina suspension optionally being hydrothermally treated at a temperature of between 20° C. and 90° C. for a period of between 0.5 and 5 hours to form to form a hydrothermally treated alumina suspension;

ii) adding an organic modifier to the alumina suspension or the hydrothermally treated alumina suspension to form a modified alumina suspension;

iii) hydrothermally treating the modified alumina suspension at a temperature of between 20° C. and 90° C. for a period of between 0.5 and 5 hours to form a hydrothermally treated modified alumina suspension; and iv) drying the hydrothermally treated modified alumina suspension to form the modified alumina.

The method may include the further step of heating the alumina suspension before the addition of the organic modifier. In such a case the alumina suspension is heated to a temperature of less than 90° C., preferably to a temperature of 85° C. and preferably for a period of between 1 and 2 hours. Time and temperature are independently selected.

The alumina may be an aluminum oxide, an aluminum oxide hydroxide, or a mixture thereof. The alumina is preferably an aluminum oxide hydroxide. The aluminum oxide hydroxide is preferably boehmite. The boehmite may be prepared from a Ziegler process using an aluminum alkoxide as a feed material. Alternatively, the boehmite may be prepared by precipitation.

The boehmite may have a cubic, platelet- or needle-like crystallite morphology. Preferably the boehmite has a platelet-like or needle-like crystallite morphology.

The boehmite crystals may have an aspect ratio in the range of from about 1.1 to 6.0, preferably 1.5 to 6.0 where the aspect ratio is the ratio of the length of the crystals in the (002) plane to the width of the crystals in the (020) plane, measured by conventional x-ray diffraction (XRD). The aspect ratios are measured by X-ray diffraction (XRD). This is a conventional technique used in the art of the invention. The aspect ratio can be calculated by the size of the crystals that are derived in directions along lines perpendicular to the planes of the X-ray diffraction patterns by using the Scherrer formula. The Scherrer formula allows the calculation of the size of the crystallite by analysis of the diffraction peaks and using the peak broadening.

The boehmite crystals have crystallite sizes on the (020) plane of between 2 nm and 200 nm, preferably a crystallite size on the (020) plane of between 3 nm and 5 nm, most preferably a crystallite size on the (020) plane of about 3.5 nm to 5.0 nm. These crystallite sizes are measured using XRD.

The boehmite crystals further have i) a crystallite (200)/(020) ratio larger than 1, preferably between 1.0 and 3.2; ii) a crystallite (002)/(020) ratio of larger than 3.0, preferably between 3.0 and 4.0; and iii) a crystallite (200)/(002) aspect ratio of 0.5 to 1.5. These crystallite ratios are also measured using XRD.

The alumina suspension may include an aluminum oxide, an aluminum oxide hydroxide, or mixtures thereof and at least water. Preferably the alumina suspension includes an aluminum oxide hydroxide and at least water. Even more preferably the alumina suspension includes boehmite and at least water. The percentage of solids in the alumina suspension is between 2 wt. % and 30 wt. %, preferably between 2 wt. % and 12 wt. %. The alumina suspension may be provided at an initial or starting pH in the range of from about 8 to about 10, for example about 9.

The method of the invention includes a hydrothermal treatment of the modified alumina suspension, and an optional hydrothermal treatment of the alumina suspension, together the hydrothermal treatments. The hydrothermal treatments are preferable carried out at a temperature above 25° C., more preferably above 30° C., more preferably above 60° C. Preferably the hydrothermal treatments is carried out at a temperature of not more than 85° C. The hydrothermal treatments are preferably carried out at a temperature of between 30° C. and 85° C., more preferably at a temperature of between 60° C. and 85° C. The hydrothermal treatments are preferably carried out for a period of between 1 and 3 hours.

It is preferable to only hydrothermally treat the modified alumina suspension.

The inventors have found that the temperature of the hydrothermal treatments, and in particular the temperature of the hydrothermal treatment of the modified alumina suspension, is critical for producing the modified alumina of the invention. As will be shown by comparative example 3, if the hydrothermal conditions are not followed then the modified alumina will not be useful for coating applications including anticorrosive applications.

The organic modifier may comprise a carboxyl group and may thus be a carboxylic acid with or without an amino group, an acrylic modifier, a high molecular weight amine, an organic compound with quaternized ammonium groups (for example, a quarternized ammonium salt), a quaternized alkyl, a quaternized pyridine, a surfactant such as an ethoxylate, a silane, an amino silane, an amino acid or a bi-functional amino acid.

The organic modifier comprises preferably a carboxyl group, an amino acid or a bi-functional amino acid.

If the organic modifier comprises a carboxyl group i.e. a carboxylic acid, the carboxylic acid may be a hydrophobic carboxylic acid. The carboxylic acid may be a short chain carboxylic acid having a carbon chain length between 6 and 10, preferably having a carbon chain length between 6 than 9 and most preferably a carbon chain length of 8, a medium chain carboxylic acid having a carbon chain length of between 11 and 17, or a long chain carboxylic acid having a carbon chain length of between 18 and 30. The carboxylic acid carbon chain may be linear or branched. Preferably the organic modifier is a short carbon chain carboxylic acid. Even more preferably the organic modifier is a linear short carbon chain carboxylic acid. Most preferably, the organic modifier is a $C_8$ linear carboxylic acid, that is, octanoic acid.

If the organic modifier is an amino acid or a bi-functional amino acid, the amino acid is preferably a hydrophobic amino acid, such as alanine, leucine or mixtures thereof. The bi-functional amino acid is preferably cysteine, taurine, thiourea or mixtures thereof.

When the organic modifier is a carboxylic acid, and in particular when the organic modifier is octanoic acid, the organic modifier is preferably added in the range of 12 to 25 mass % to alumina when all alumina is accounted for as $Al_2O_3$, most preferably in the range of 20 to 23 mass %.

The method preferably comprises monitoring and adjusting the pH of the alumina suspension or the hydrothermally treated alumina suspension as the organic modifier is added to the alumina suspension or the hydrothermally treated alumina suspension to form a modified alumina suspension. The pH of the alumina suspension or the hydrothermally treated alumina suspension may be controlled, with a pH meter, to be in the range of from about 2 to about 9, preferably in the range of from about 4 to about 6. If necessary, the pH of the alumina suspension or the hydrothermally treated alumina suspension as the organic modifier is added may be adjusted by adding a base. The base preferably is ammonia or a derivative thereof, including but not limited to aqueous ammonia, urea, hydrazine, hydroxylamine or hexamethylenetetramine, or alkali metal hydroxide and/or earth alkali metal hydroxide, whereas ammonia and derivatives thereof are more preferred.

Drying the hydrothermally treated modified alumina suspension to form the modified alumina may be by means of spray drying, contact drying, vacuum/mixer drying spin flash drying and the like. These methods are known to a person skilled in the art of the invention.

The modified alumina preferably comprises a platelet crystallite morphology. The crystallite size of the modified alumina preferable ranges from 2 nm, preferably 2.5 nm to about 200 nm, preferably between 3 nm and 5 nm. Without wishing to be bound by theory, the inventors believe that the temperature of the hydrothermal treatment as claimed in the present invention limits the extent of crystal growth, resulting in a modified alumina with crystallites in the preferred range.

The modified alumina preferably has a carbon content in the range of 3 to 10 mass %, more preferable 5 to 8 mass %.

The modified alumina preferable has a BET surface area in the range of 250 to 300 $m^2/g$, more preferable 270 to 290 $m^2/g$. The BET surface area is measured following heat treatment of the modified alumina in air at 550° C. for three hours.

The modified alumina preferably is a modified boehmite. The crystallite size of the modified boehmite on the (120) plane preferably ranges from 2 nm, preferably 2.5 nm to about 200 nm, preferably between 3 nm and 5 nm. The modified boehmite preferably has i) an aspect ratio on the (200)/(020) plane of between 1.0 and 6.0, preferably 1.0 and 3.2 and more preferably between 2.5 and 3.2, ii) an aspect ratio on the (002)/(020) plane of between 1.1 and 6.0, preferably larger than 3 and most preferably between 3.0 and 4.0; and iii) an aspect ratio on the (120)/(020) plane of between 1 and 2, preferably 1.10 and 1.40. The aspect ratios are measured using XRD.

The geometric relationship between the crystallite size of plane (020), (200) and (002) can be used to describe some aspects of the crystal shape. The modified boehmite crystal preferably is longer in the (002) than the (200) and is also shorter in the (020) than in any of the other axis. The preferred (020) size is from about 3 to about 5 nm.

It has been found that the modified alumina can be used in various applications including coating applications, particularly adhesive coating applications including anticorrosive compositions and primer formulations (for example bridges, cars etc.).

According to a second aspect of the invention there is provided a modified alumina prepared according to the method of the invention.

According to a third aspect of the invention there is provided a modified alumina which is a modified boehmite having:

i) a crystallite size on the (120) plane ranging from 2 nm to 200 nm; and ii) an aspect ratio on the (120)/(020) plane of between 1 and 2.

The modified boehmite may have:

i) an aspect ratio on the (200)/(020) plane of between 1.0 and 6.0;

ii) an aspect ratio on the (002)/(020) plane of between 1.1 and 6.0; and

The aspect ratios are measured using XRD.

The modified boehmite preferably has a carbon content in the range of 3 to 10 mass %, more preferable 5 to 8 mass %.

The modified boehmite preferably has a BET surface area in the range of 250 to 300 $m^2/g$, more preferable 270 to 290 $m^2/g$. The BET surface area is measured following heat treatment of the modified alumina in air at 550° C. for three hours.

The crystallite size of the modified boehmite on the (120) plane preferably ranges from 2.5 nm to about 200 nm, preferably between 3 nm and 5 nm. The modified boehmite preferably has i) an aspect ratio on the (200)/(020) plane of between 1.0 and 3.2 and more preferably between 2.5 and 3.2, ii) an aspect ratio on the (002)/(020) plane larger than 3 and most preferably between 3.0 and 4.0; and iii) an aspect ratio on the (120)/(020) plane of between 1.10 and 1.40. The aspect ratios are measured by XRD.

The modified boehmite crystal preferably is longer in the (002) than the (200) and is also shorter in the (020) than in any of the other axis. The preferred (020) size is from about 3 to about 5 nm.

The modified alumina of the invention is used in coating applications including anticorrosive compositions and primer formulations.

The modified alumina of the invention may be dispersible in a moderately polar solvent, for example, isopropanol. Instead or in addition, the modified alumina may be dispersible in a moderately hydrophobic ether, for example, propylene glycol methyl ether acetate (PGMEA). The modified alumina may also be dispersible in a water-born or a solvent-born paint. The modified alumina may be dispersible in mixtures of water-miscible ethers and water, for example mixtures of ethylene glycol butyl ether (EGBE) and water.

The modified alumina of the invention may be dispersed using conventional methods, for example stirring or wet milling.

According to a fourth aspect of the invention there is provided a coating composition including the modified alumina of the invention and a dispersant.

The dispersant may be a cross-linking agent or a paint.

Crosslinking agents may comprise acrylic esters, methacrylic esters, acrylates, methacrylates, (comprising trimethylpropane trimethacrylate (TMPTMA) and trimethylpropane triacrylate (TMPTA)), epoxy acrylates and urethane acrylates. The crosslinking agent is preferably a methacrylate and most preferably TMPTMA.

The paint may be a water born or a non-aqueous solvent born paint.

The coating composition may be used in anti-corrosive applications, paints, coatings, low molecular weight polymers such as alkyds, polyepoxies, polyurethane, acrylic resins, thermoplastics and elastomeric resins.

In anti-corrosion applications, the coating composition advantageously inhibits corrosion of metals such as hot- and cold-rolled mild steel and carbon steel, copper and aluminum, amongst others, in a wet environment.

The modified alumina composition obtained by the process of the invention can also be used in the preparation of nano-coatings to be used in various technological applications. These coatings can exhibit the unique characteristics of having acid centers dispersed on large surface areas. and can host highly dispersed catalytic centers having various functionalities. These characteristics are very favorable for the improvement of catalytic activity. Further applications comprise the use of resistant coatings for improving the heat transfer between a surface of a liquid or a gas in catalytic reactors or industrial process to save energy, controlling or modifying thermal expansion properties, polishing, optical, electronic applications and in semiconductors.

EXAMPLES

The invention will now be exemplified with reference to the following non-limiting examples and with reference to the Figures in which.

EXAMPLE 1

Figure 1:
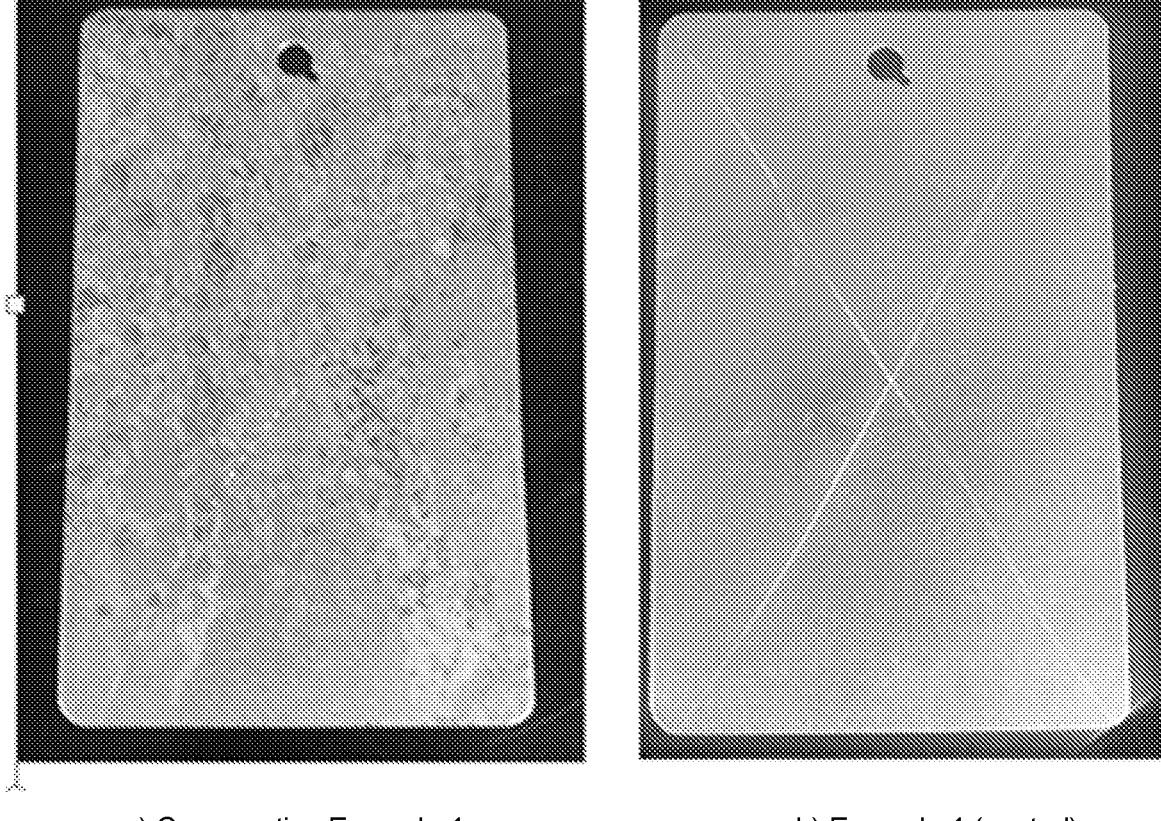
FIG. 1 shows the plate of Comparative Example 1 and the plate of Example 1 after corrosion testing.

Preparation of Modified Alumina Composition as Per the Present Invention:

A suspension including Ziegler-derived boehmite and water (2000 g of slurry) was heated, 178.6 g boehmite and the remainder water An organic modifier, in this case octanoic acid (33 g), was added and the suspension was hydrothermally treated at 80° C. for 2 h in a round bottom flask, under reflux. The modified boehmite suspension obtained after the hydrothermal treatment was diluted with deionized water (3000 g). No adjustment of pH was made. The modified boehmite suspension was dried in a standard spray dryer to form a modified alumina.

The starting boehmite had a platelet-like shape with size from the X-ray (020) reflex of about 3.4 nm, and a size of about 4.3 nm (120) reflex.

The modified boehmite had a platelet-like shape with size from the X-ray (020) reflex of about 3.7 nm, and a size of about 4.7 nm (120) reflex. The crystallite morphology was platelet-elongated in length, with an aspect ratio 200/020 (width:thickness) of about 2.7 and an aspect ratio 002/020 (length:thickness ratio) of about 3.4.

Coating of Plates:

0.2 g of an anti-corrosion composition comprising the modified alumina prepared as above was added to 40 g of isopropyl alcohol (IPA) and stirred for between 5 and 10 minutes with a magnetic stirrer to form an anticorrosive suspension.

A stainless steel plate of approximately 4 cm×15 cm was coated with the modified alumina corrosion composition. The plate was prepared by washing with at least 25 ml methylethylketone (MEK) as a degreasing solvent, and then air drying.

The anticorrosive suspension was spray coated onto the test plate using a 10 ml spray bottle. The spray bottle had a spray head with a small opening in order to create a mist of the anti-corrosion composition in a stream of nitrogen flowing through the nozzle, thereby to form a wet film on the test plate. The spray coating process was repeated 2 or 3 times, such that between 20 ml and 30 ml of the anti-corrosive suspension was used to coat the plate. The spray coated test plate was air dried for about 10 minutes and subsequently thermally treated at 150° C. for 1 h under a nitrogen atmosphere.

The coating on the test plate was transparent, which demonstrates the ability of the anti-corrosion composition to coat the substrate thinly and uniformly with nano-sized particles.

COMPARATIVE EXAMPLE 1

A control plate washed only with MEK and air dried, but not coated with the anticorrosive suspension was also thermally treated under the same conditions (150° C. for 1 h under a nitrogen atmosphere).

Corrosion resistance of the two plates from Example 1 and Comparative Example 1 were determined according to the method described below:

Corrosion Testing

Corrosion testing of Example 1 and Comparative Example 1 was performed by subjecting each plate to a water vapor environment inside a water bath chamber, using a Precision stainless steel water bath chamber Model 183. Both plates were placed inside the chamber which was set at 60° C. and left for a period of at least 5 hours.

FIG. 1 shows that no rust was formed on the plate of Example 1 coated with the anti-corrosion composition of the invention, whereas the Comparative Example 1 plate clearly showed rust formation.

The inventors noticed that contact angles of deionized water on corroded surfaces is lower than on non-corroded surfaces.

A Krüss DSA 25 apparatus was used to measure contact angles using deionized "DI" water droplets on sample surfaces. A drop of DI water was dispensed on the sample surface. A video image of the drop was analyzed and the contact angle was measured as the angle between the drop's contour and the line representing the surface (baseline).

The Contact angle test conditions were as follows:

Sessile drop method

Young LaPlace fitting method.

Automatic baseline 8.0 µL drop volume.

Measurement time of 60 seconds/1 frames per second.

Measurement temperature 20-21° C. (room temperature).

Steel plate used as solid measurement surface and DI water test liquid

The water contact angle was taken as the average of three water droplets. Data from the contact angle measurements using water as a probe solvent is shown in Table 1.

TABLE 1

| Contact angle measurements | | |
|---|---|---|
| Stainless Steel Plate | Contact Angle (before corrosion testing) | Contact Angle (after corrosion testing) |
| Comparative Example 1 | 55 | 32 |
| Example 1 | 85 | 94 |

The water contact angle of Example 1 that was able to display corrosion resistance properties was just above an angle of 80 and it did not show any change after the surface was exposed to a steam test, despite the thin coating. This is indicative that the surface of Example 1 has not corroded in a wet atmosphere. On the other hand, the contact angle of Comparative Example 1 dropped from 55 to 32, indicating that considerable corrosion had taken place.

COMPARATIVE EXAMPLE 2

Comparative Example 2 demonstrates the technical effect of the present invention when compared with prior art document U.S. Pat. No. 4,419,137 i.e. modification with Ca2+ etc.

100 g of boehmite powder was vigorously stirred in 400 mL of DI water, the pH of the mixture was 6.75. Calcium hydroxide was then added slowly until the pH reached 12. Once the pH was stable for 1 hour at the value of 12+/−0.01 no further addition of calcium hydroxide was carried out. The resultant mixture was filtered and washed. The resulting material was then milled after dilution with water. The product showed an amount of calcium of 4.7% wt. The resulting particle size of the product, before drying, was below 30 μm.

A stainless steel plate of approximately 4 cm×15 cm was coated with the sample obtained using the procedure of Comparative Example 2, using the same method as was used for Example 1, including the same steps of degreasing, drying, spray coating, dry coating and thermal treatment.

Figure 2:
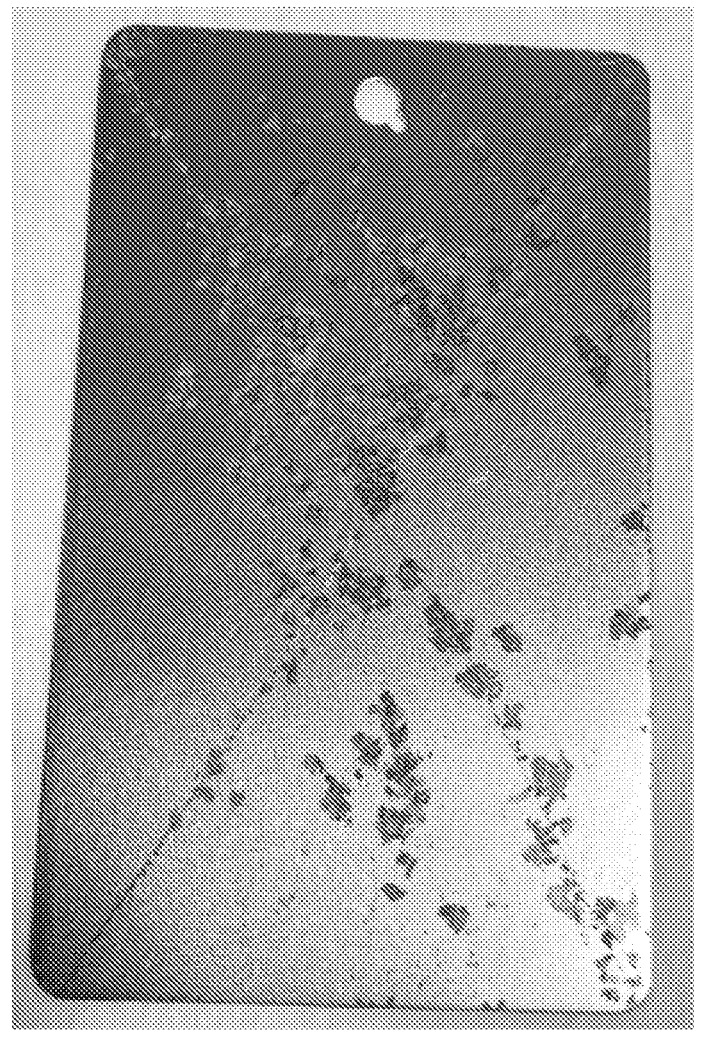
FIG. 2 shows the plate of Comparative Example 2 after corrosion testing.

Corrosion testing of the resulting plate was performed according to the procedure described for Example 1. FIG. 2 shows that rust was formed on the plate coated with the sample obtained using the procedure of Comparative Example 2. Contact angles were measured using the procedure described for Example 1 and are reported in Table 2.

TABLE 2

Contact angle measurements, Comparative Example

| Stainless Steel Plate | Contact Angle (before corrosion testing) | Contact Angle (after corrosion testing) |
|---|---|---|
| Comparative Example 2 | 55 | 24 (area 1 - significantly corroded) 43 (area 2 - less corroded) |

COMPARATIVE EXAMPLE 3

This Comparative Example shows the importance of hydrothermal treatment conditions for the present invention and its use in anti-corrosive compositions as compared with the modified alumina exemplified in the Applicants application US2020/0056049, incorporated herein by reference for all purposes.

A product, obtained according to the procedure described in the Example 1 of US2020/0056049 (Hydrophobic Surface Modified Aluminas and Method for Making Thereof), was coated on a steel plate according to the procedure of Example 1.

According to the procedure described in US2020/005649, a starting boehmite slurry which has a block-like shape is first prepared. An amount of organic composition, in this case octanoic acid, is then added to the stirred vessel with the boehmite slurry at 105° C. for 2 hours to form an acidic modified slurry that is spray dried to give oblong crystallites.

Figure 3:
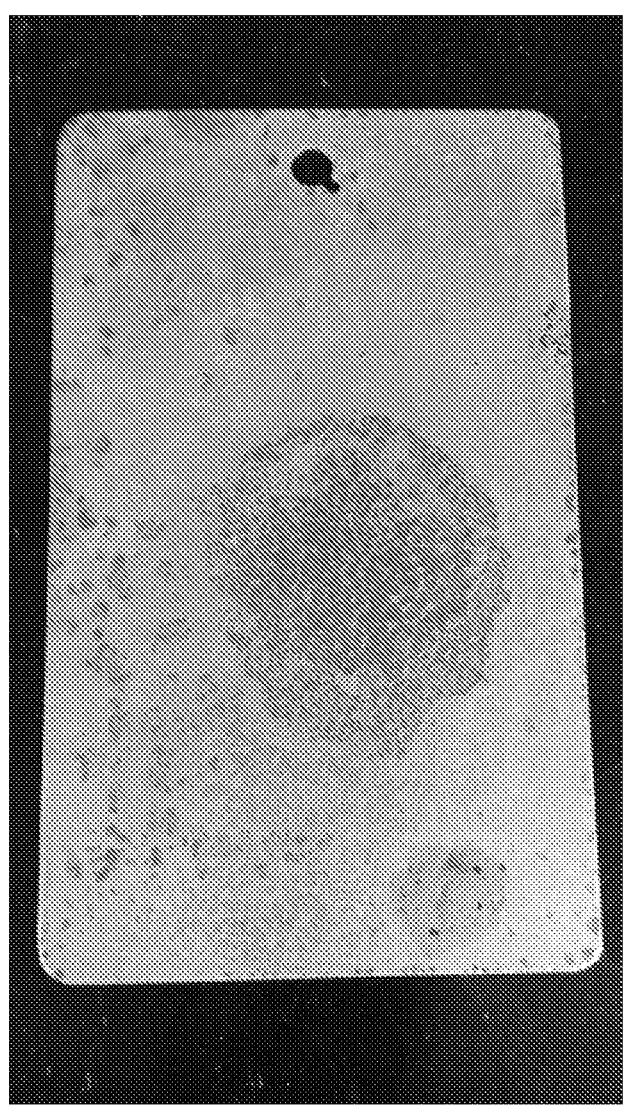
FIG. 3 shows the plate of Comparative Example 3 after corrosion testing.

FIG. 3 shows that rust was formed, whereas the Example 1 plate clearly showed no rust formation.

This shows the importance of the hydrothermal treatment.

EXAMPLE 2

Example 2 demonstrates the dispersibility of the modified alumina of the invention. As is modified boehmite prepared in accordance with example 1 was mixed with a 50:50 by mass mixture of ethylene glycol butyl ether (EGBE) and deionized water for 30 minutes using a stir bar. It was found that a 5 mass % sol of modified alumina in a 50:50 EGBE:water mixture prepared in this manner was stable for more than a week with only slight sedimentation taking place.

EXAMPLE 3

Example 3 demonstrates the dispersibility of the modified alumina of the invention and to illustrate particle size and zeta potential distribution in the solvent when using wet milling.

A Netzsch mill was used to wet mill 5 wt. % of the modified boehmite prepared in accordance with example 1 in isopropyl alcohol (IPA). The following milling conditions were used:

Zeta bead plus 0.5-0.6 mm Yttrium stabilized
Pump speed=125 rpm
Agitator speed=1200 rpm
Milling time=1 hour
Screen size=0.2 mm The milled product exhibited very good dispersion of alumina in IPA that stayed stable for at least 10 days. No sedimentation of alumina particles was visually observed.

Particle size and zeta potential distributions of the milled product exhibited nano-particle size distributions, while measuring the zeta potentials showed a broad zeta potential distribution (−80 to 100 mV). The high zeta potential is indicative of a stable dispersion.

A corrosion test was performed using the milled product following an approach similar to that set out in example 1. No corrosion spots were observed.

The invention claimed is:

1. A modified alumina comprising:
    a boehmite modified with a carboxylic acid having a carbon chain length of less than 10 and at least 6, the modified alumina having:
        i) a crystallite size on the (120) plane ranging from 2 nm to 200 nm;
        ii) an aspect ratio on the (120)/(020) plane of between 1 and 2;
        iii) an aspect ratio on the (200)/(020) plane of between 1.0 and 6.0;
        iv) an aspect ratio on the (002)/(020) plane of between 3.0 and 6.0; and
        v) a carbon content in the range of 3 to 10 mass %.

2. A coating composition including the modified alumina of claim 1 and a dispersant.

3. A method of producing the modified alumina of claim 1, the method comprising the steps of:
    i) providing an alumina suspension comprising alumina and water, the alumina suspension optionally being hydrothermally treated at a temperature of between 20° C. and 90° C. for a period of between 0.5 and 5 hours to form a hydrothermally treated alumina suspension;
    ii) adding an organic modifier to the alumina suspension or the hydrothermally treated alumina suspension to form a modified alumina suspension;

iii) hydrothermally treating the modified alumina suspension at a temperature of between 20° C. and 85° C. for a period of between 0.5 and 5 hours to form a hydrothermally treated modified alumina suspension; and iv) drying the hydrothermally treated modified alumina suspension to form the modified alumina.

4. The method of claim 3 in which the alumina is boehmite.

5. The method of claim 4 in which the boehmite have crystallite sizes on the (020) plane of between 2 nm and 200 nm.

6. The method of claim 3 in which the modified alumina suspension is hydrothermally treated at a temperature of between 30° C. and 85° C.

7. The method of claim 3 in which the modified alumina suspension is hydrothermally treated for a period of between 1 and 3 hours.

8. The method of claim 3 in which the organic modifier is a carboxylic acid.

9. The method of claim 8 in which the carboxylic acid is a short chain carboxylic acid having a carbon chain length of less than 10 and at least 6.

* * * * *